United States Patent [19]

Foller

[11] 3,906,985

[45] Sept. 23, 1975

[54] VALVE

[75] Inventor: Werner Foller, Heiligenrode, Germany

[73] Assignee: Gestra-KSB Vertriebsgesellschaft mbH & Co. Kommanditgesellschaft Bremen, Bremen, Germany

[22] Filed: Nov. 30, 1973

[21] Appl. No.: 420,477

[30] Foreign Application Priority Data

Dec. 2, 1972 Germany............................ 2259079

[52] U.S. Cl. ................................................ 137/192
[51] Int. Cl.² ............................................ F17T 1/20
[58] Field of Search ........... 137/192, 202, 399, 436, 137/630

[56] References Cited
UNITED STATES PATENTS

| | | | |
|---|---|---|---|
| 758,965 | 5/1904 | Gulland | 137/195 |
| 811,420 | 1/1906 | Marsh | 137/195 |
| 2,003,069 | 5/1935 | Carter | 137/192 X |
| 2,590,495 | 3/1952 | Bienaime | 137/192 |
| 2,673,618 | 3/1954 | Batchelder | 137/202 |
| 2,869,584 | 1/1959 | Gordon | 137/630 |

FOREIGN PATENTS OR APPLICATIONS

| | | | |
|---|---|---|---|
| 807,348 | 6/1951 | Germany | 251/30 |
| 815,878 | 10/1951 | Germany | 251/44 |
| 554,717 | 3/1923 | France | 137/436 |
| 783,352 | 4/1935 | France | 137/436 |

*Primary Examiner*—Alan Cohan
*Attorney, Agent, or Firm*—Allison C. Collard

[57] ABSTRACT

A float controllable valve or steam trap which is responsive to a level of condensate consisting of a housing having an internal chamber including input and discharge openings, and a cylinder forming a pressure chamber over the discharge opening. The cylinder has an opening that defines a valve seat and nozzle communicative with the discharge opening. A piston is coaxially disposed around the nozzle for movement within the cylinder. A locking means consisting of a ball valve is coupled to the piston to close the valve seat and a float within the housing chamber raises the piston in response to an increased level of condensate to open the valve and permit the condensate to exit from the discharge opening.

4 Claims, 2 Drawing Figures

US Patent    Sept. 23,1975    3,906,985

VALVE

This invention relates to a valve.

More specifically this invention relates to a float controllable steam trap having a locking means at the input pressure side which is controlled by an activating mechanism and an associated stationary valve seat. When the locking mechanism is lifted from the locking position means are provided which act as a sudden and strong relieve for the same.

In float controlled steam trap, the closing portion must rapidly open to discharge the liquid, so as to avoid excessive flow wear at the closing portions of the trap. In steam traps, this wear is due to the high condensation temperature and the jamming of dirt particles between the closing portion and the valve seat. The same requirements to reduce the wear may be desirable in pneumatically or magnetically operated valves and especially, in rapid closing valves.

In a conventional float controlled steam trap (German Pat. No. 521,036), the trap can be opened by complicated lever mechanisms having interposed springs. However, such mechanisms are expensive. Furthermore, the required operating forces are high, so that these types of valves do not function satisfactorily.

It is therefore an object of the present invention to provide a valve having rapid opening and closing characteristics which eliminate complicated lever mechanisms as well as springs, to avoid all of the aforementioned disadvantages.

It is a further object of the invention to provide small manufacturing tolerances which keep both the manufacturing costs and the impurity level relatively low.

In the inventive valve, the operating force to lift the closing portion from the closed position is defined by the pressure exerted thereon. The pressure is applied to both sides of the piston and is thus held in a state of balance so as not to exert any pressure onto the locking portion. As soon as the actuator for the locking device has lifted to a certain extent and a flow takes place, there is a pressure reduction of the medium in the throttle opening of the pressure chamber of the cylinder. Thus, one side of the piston is subjected to a lower pressure in the pressure chamber, while a full pressure is applied to the other side of the piston. This results in a force from the piston to the locking means in the direction of the opening which counteracts the force in the locking direction of the locking device. By a proper adjustment of the flow diameter, the relieve effect can be adjusted to the desired requirements. In an extreme case, the valve may open when the flow of liquid occurs without any further actuation from the outside. In conjunction with a float body acting as the actuating device, the only requirement of the flow diameter is that an ultimate force difference remain between the actuating force of the floating body and the line of force of the relieved valve.

Therefore, without using lever mechanisms and other elements of conventional device, a valve has been developed which can be rapidly opened and closed as desired. The inventive valve can also be constructed in a smaller size because the opening and closing requirements for the valve are smaller. The total quantity of the liquid flows through the throttle opening and through the pressure chamber. Hence, the measuring tolerances may be relatively large without impairing the effectiveness of the valve.

In a further embodiment of the invention, the locking portion as well as the valve seat are located in the pressure chamber adjacent to the throttle opening within the cylinder. This results in a compact and simple construction of the valve.

In still a further embodiment, there is no tightening between piston and cylinder, or the piston and the nozzle respectively, so that greater diameter tolerances can be selected. Furthermore, it is not necessary to provide a throttle opening into the cylinder wall or into the piston, as the annular slots between the piston and the cylinder or between the piston and the centrally arranged nozzle act as throttle openings so that the manufacturing costs of the inventive valve can be reduced.

The invention also provides a method for influencing the opening and closing operation. This permits a stroke dependence in pressure within the pressure chamber. Therefore, the pressure force which is applied to the locking means can be adjusted as a function of the stroke. An actuating rod is attached to the locking means which extends through the wall of the cylinder.

Other objects and features of the present invention will become apparent from the following detailed description taken in connection with the accompanying drawings which disclose several embodiments of the invention. It is to be understood, however, that the drawings are designed for the purposes of illustration only, and are not intended as a definition of the limits and scope of the invention.

In the drawings, wherein similar reference numerals denote similar elements throughout the several views.

Figure 1:
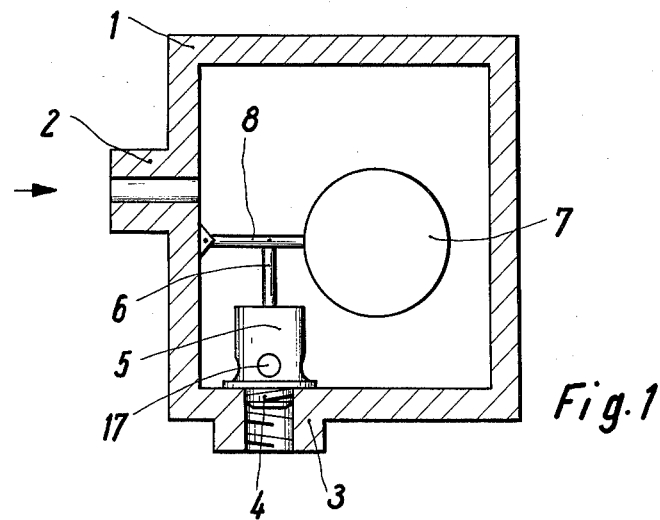
FIG. 1 shows a float controlled steam trap.

FIG. 1 shows a conductor housing 1 having a supply opening 2 and a discharge opening 3. A cylinder 5 is mounted on a valve seat body 4 within housing 1. An adjusting rod 6 extends upwardly from the cylinder. A floating body 7 engages a stroke adjusting pivotable lever 8.

Figure 2:
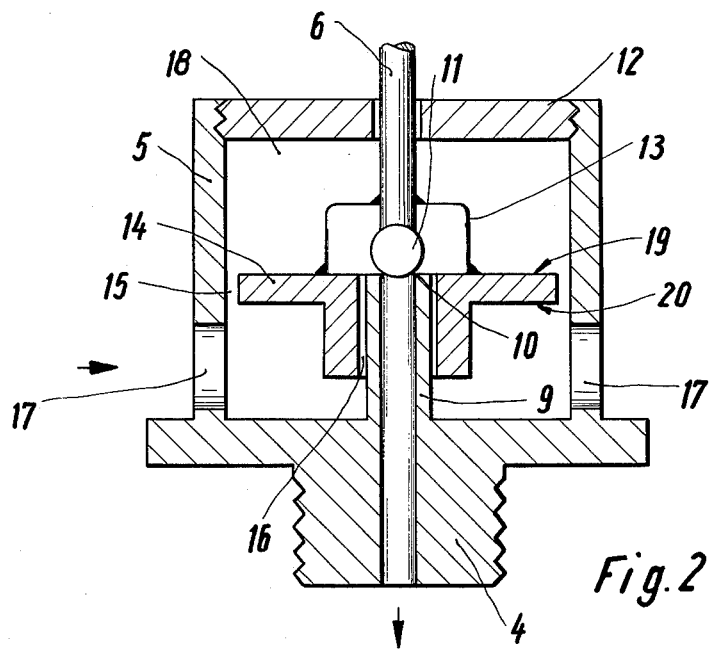
FIG. 2 shows the locking means and the piston of the trap according to FIG. 1.

Valve seat body 4 and cylinder 5 are shown in a detail cross-sectional view in FIG. 2. Valve seat body 4 includes an axial nozzle 9 which extends into cylinder 5. A valve seat 10 is provided at the free end of the nozzle 9. A stroke type moving ball closing portion 11 cooperates with the valve seat. On the opposite side of valve seat 10 an actuating rod 6 for floating body 7 is connected to closing portion 11 and extends through the cylinder cover 12. Closing portion 11 together with actuating rod 6 is connected with an annular piston 14 by means of a connecting member 13. Connecting member 13 may be a spring biasing means connecting locking means 11 and piston 14. This piston slides between annular slots 15 and 16 within cylinder 5 on nozzle 9. Cylinder 5 is mounted on valve seat body 4 and comprises radial input openings 17 below piston 14 for the medium to be discharged. Annular slots 15 and 16 form throttle openings through which the entire amount of discharged medium flows into the pressure chamber 18 above piston 14. Locking portion 11 and valve seat 10 are located in the pressure chamber.

The operation of the valve is as follows:

When locking means or ball valve 11 is in its locked or closed position on the seat of nozzle 9, full pressure is applied to piston 14 in both directions. Thus the piston is balanced with respect to the applied pressure, so that no forces are exerted on locking means 11. Full pressure is applied to locking means 11, as well as the free end of actuating rod 6 outside of cylinder 5 in the closed direction. This defines the force which has to be exerted by floating body 7 in order to open the valve.

When a sufficient force is applied to floating body 7 by an increasing level of condensate in housing 1 so as to raise locking means 11, a flow of condensate starts. The condensate then flows into pressure chamber 18 through inputs 17 and annular slots 15 and 16 and there is a reduction in pressure between annular slots 15 and 16, and also in pressure chamber 18. A lower pressure is applied to upper surface 19 of piston 14 in pressure chamber 18, while the higher pressure (full inlet pressure) occuring before the annular slots 15 and 16 is applied to the lower portion of piston 20. This results in an additional force by piston 14 exerted to locking means 11 in the direction to open locking device 11.

The previously mentioned balanced forces between the pressure forces in direction of closing and the opening forces of floating body 7 in the condensate are therefore in a unbalanced state. Therefore an excess of opening forces are available to open locking means 11.

As the condensate level decreases while the valve is open, locking means 11 begins to close discharge line 3 to a certain extent. As the discharge line closes, the forces on the upper surface of piston 19 increase further due to the increase in pressure in chamber 18 to increase the locking forces of the valve and overcome the buoyancy forces of floating body 7 so that the discharge line rapidly and completely closes.

The internal walls of the closed cylinder may be conically shaped in the stroke or region of movement of the piston. Throttle opening 15 may also consist of an axial slot formed between the front surface of the piston and the cylinder. Locking means or ball valve 11 may also be connected to the piston by a spring biased member.

While only a few embodiments of the present invention have been shown and described, it will be obvious that many changes and modifications may be made thereunto without departing from the spirit and scope of the invention.

What is claimed is:

1. A float controllable steam trap, valve and the like responsive to a level of condensate comprising:

a housing having an internal chamber including an input supply opening and a discharge opening;

a cyclinder disposed over the discharge opening within the internal chamber of said housing, said cylinder having at least one radial input opening communicative to the housing member, and a nozzle defining a valve seat and communicative with the discharge opening;

a piston movably disposed on said nozzle and defining a pressure chamber within said cylinder;

locking means connected to said piston for closing contact with the valve seat of said nozzle, said piston defining a first throttle opening between the walls of the cylinder and the piston, and a second throttle opening between said piston and the valve seat of said nozzle, the pressure chamber being communicative through said first and second throttle openings to the radial input openings of said cylinder in both the opened and closed positions of the valve seat;

a float disposed with the housing chamber; and means physically connecting said piston and locking means and extending through said cylinder and coupled to said float, wherein when an inlet pressure is applied to the inlet supply opening of said housing, the pressure is applied to one side of said piston to load the piston in a valve-opening direction, and applied to the opposite side of said piston through said throttle openings so as to load said piston in a valve-closing position, so that when the condensate fills the housing chamber and raises said float and locking means from said valve seat, the condensate will be drained through said throttle opening into the discharge opening of said housing.

2. The valve as recited in claim 1 comprising spring biasing means connecting said locking means and piston.

3. The valve as recited in claim 1 wherein said locking means is a ball valve for sealing contact with said valve seat.

4. The valve as recited in claim 1, wherein said means physically connecting said piston and locking means comprises a rod extending through the walls of said cylinder and coupled to said float.

* * * * *